(12) United States Patent
Yan et al.

(10) Patent No.: US 9,681,345 B2
(45) Date of Patent: Jun. 13, 2017

(54) DATA TRANSMISSION METHOD FOR MOBILE RECEIVER IN PUBLISH/SUBSCRIBE SYSTEM

(71) Applicant: Computer Network Information Center, Chinese Academy of Sciences, Beijing (CN)

(72) Inventors: Zhiwei Yan, Beijing (CN); Xiaodong Li, Beijing (CN)

(73) Assignee: China Internet Network Information Center, Beijing (CN)

( * ) Notice: Subject to any disclaimer, the term of this patent is extended or adjusted under 35 U.S.C. 154(b) by 0 days.

(21) Appl. No.: 14/888,993

(22) PCT Filed: Dec. 18, 2013

(86) PCT No.: PCT/CN2013/089856
§ 371 (c)(1),
(2) Date: Nov. 4, 2015

(87) PCT Pub. No.: WO2015/062147
PCT Pub. Date: May 7, 2015

(65) Prior Publication Data
US 2016/0234738 A1    Aug. 11, 2016

(30) Foreign Application Priority Data

Nov. 4, 2013   (CN) .......................... 2013 1 0537460

(51) Int. Cl.
*H04L 1/00*     (2006.01)
*H04W 36/02*    (2009.01)
(Continued)

(52) U.S. Cl.
CPC ........... *H04W 36/026* (2013.01); *H04L 67/26* (2013.01); *H04L 69/28* (2013.01); *H04W 36/08* (2013.01);
(Continued)

(58) Field of Classification Search
CPC .......... H04B 2201/70726; H04B 7/216; H04B 7/2668; H04B 7/024; H04B 7/0413;
(Continued)

(56) References Cited

U.S. PATENT DOCUMENTS

2005/0255847 A1*  11/2005  Han ..................... H04W 36/30
                                                    455/436

* cited by examiner

*Primary Examiner* — Dady Chery
(74) *Attorney, Agent, or Firm* — SV Patent Service

(57) ABSTRACT

A method is disclosed providing data transmission for a mobile receiver in a publish/subscribe system. The method comprises: 1) handover trigger: detecting a new access router AR2 by a mobile receiver in the publish/subscribe system; and sending a handover trigger message comprising AR2 identification information from the mobile receiver to a router AR1 currently connected to the mobile receiver; 2) handover preparation: receiving the handover trigger message by the AR1; selecting a branch node of the most recent position before handover as a proxy for the mobile receiver; and forwarding data packets to paths of the mobile receiver before and after handover; and 3) handover execution: handover access router of the mobile receiver to AR2 by the proxy; after the step of handover access router, triggering AR2 and AR1 to update data transfer for the mobile receiver; sending the data packets through the AR2 to the mobile receiver. The present invention has high handover performance, and can reduce handover time delay and data packet loss.

6 Claims, 3 Drawing Sheets

(51) Int. Cl.
*H04W 40/02* (2009.01)
*H04L 29/08* (2006.01)
*H04L 29/06* (2006.01)
*H04W 36/08* (2009.01)
*H04W 36/00* (2009.01)

(52) U.S. Cl.
CPC ........ *H04W 40/02* (2013.01); *H04W 36/0016* (2013.01)

(58) Field of Classification Search
CPC ... H04B 7/0452; H04B 7/0495; H04L 1/0048; H04L 1/06; H04L 1/0002; H04L 1/20; H04W 16/28; H04W 28/0257; H04W 28/04; H04W 36/0083
USPC ............... 370/329–335; 455/456.1–456.6, 455/436–438, 442–444, 524–525
See application file for complete search history.

DATA TRANSMISSION METHOD FOR MOBILE RECEIVER IN PUBLISH/SUBSCRIBE SYSTEM

TECHNICAL FIELD

The present invention relates to a data transfer method, particularly to a data transmission method for a mobile receiver in a publish/subscribe system.

BACKGROUND OF THE INVENTION

With the rapid development of information technology, new Internet applications constantly emerge, resulting in many challenges for traditional IP technologies. In particular, the rapid development of mobile communication technologies, and the emergence of the Internet of Things, cloud computing, and new data applications, is gradually changing the traditional model of accessing service resources by Internet users. The Internet has evolved from the basic function of interoperability to support the needs of massive data exchange. Network security and efficient mobilization also present new challenges.

In recent years, researchers used a lot of ways and means to improve and optimize the existing Internet, in order to support larger scale and more efficient data access to resources. These efforts include construction of more data centers in the Internet architecture, and more widely used data transmission optimization technologies such as P2P in the transportation level. These "patch" approaches, however, have resulted in more and more redundant architecture and more complex functions in the traditional Internet. To address these issues, scholars have carried out many studies on the redesign of the future network architecture, which have been promoted the level of national strategies. The goal of these studies is to fundamentally resolve the problems involved in supporting highly efficient data transmissions in the current Internet. Future information-centric network system (Information Centric Networking, ICN), that has received widespread interest, replaces address of the host by the content identification to establish a new network architecture with addressing and routing based on content name. Among these future systems, "publish/subscribe systems" (Publish-Subscribe Internet Technology, or PURSUIT) is one of the most representative program.

Compared with traditional methods, PURSUIT separates content publishers and content requester, and ensures security and manageability of the system by enhanced centralized management. Its network architecture is shown in FIG. 1. Among them, the convergence point (Rendezvous) functional entity is responsible for maintaining releases and requests of the content. The topology management (Topology Manager) is responsible for calculating routing information between the requester and publisher, and building hop source routing information according to Bloom rule.

When a publisher obtains some resources, it first registers with Rendezvous (1). The recipient wishing to subscribe to content of interest first initiates a request (2) to Rendezvous. Rendezvous matches the publisher and the recipient's information and informs the Topology Manager (3). The Topology manager calculates Bloom string containing routing information based on position information of the publisher and the recipient, and sends the information to the publisher (4). The publisher releases the content based on the Bloomberg string (5). The router determines how to forward the packet (6, 7) according to the Bloom string.

In the current PURSUIT, when the recipient moves, the recipients is required to send re-subscribe message sent to Rendezvous, which requires recalculation of source routing as well as to re-notification to the publisher, which causes additional handover delays. To address this drawback, the present patent application proposes an improved data transmission method for PURSUIT mobile receivers based on distributed dynamic branch node, which supports efficient mobility routing and handover in PURSUIT.

SUMMARY OF THE INVENTION

To address technical problems in conventional technologies, the object of the present invention is to provide a data transfer method for mobile receivers in a publish/subscribe system. The present method proposes using the mobile node (MN) that is the branch node of the most recent position of the mobile receiver before handover as a proxy for the mobile receiver, and simultaneously forwarding data packets to the path before and after the MN switch. In order to ensure scalability of this protocol, the selection of the proxy is determined in dynamic and distributed manner. In addition, it should also guarantee the performance of handover to minimize handover latency and packet loss.

Aspects of the present invention include:

A method of data transmission for mobile receiver in a publish/subscribe system, comprising the steps of:

1) handover trigger: detecting a new access router AR2 by a mobile receiver in the publish/subscribe system; and sending a handover trigger message comprising AR2 identification information from the mobile receiver to a router AR1 currently connected to the mobile receiver;

2) handover preparation: receiving the handover trigger message by the AR1; selecting a branch node of the most recent position of the mobile receiver before handover as a proxy for the mobile receiver; and forwarding data packets to paths of the mobile receiver before and after handover; and 3) handover execution: handover access router of the mobile receiver to AR2 by the proxy; after the step of handover access router, triggering AR2 and AR1 to update data transfer for the mobile receiver; sending the data packets through the AR2 to the mobile receiver.

Furthermore, the step of selecting a branch node of the most recent position of the mobile receiver before handover as a proxy for the mobile receiver can include:

21) requesting, by AR1 from the convergence system RS, a path from the publisher to AR2, the publisher to provide the data to be received by the mobile receiver; returning zFilter corresponding to the Bloom string from RS to AR1;

22) sending a probe message on a reverse path from AR1 to the publisher, the probe message comprising the Bloom string zFilter; and 23) receiving the probe message by a forwarding node FN on the reverse path; determining if the Bloom string zFilter includes associated path identifier; and if so, determining if the forwarding node FN is the nearest branch node of AR1 and AR2 and if so, stop forwarding the probe message; and if not, continuing to forward the probe message upstream from the forwarding node FN.

Furthermore, the step of triggering AR2 and AR1 to update data transfer for the mobile receiver can include:

31) forwarding data packets received by AR1 but not yet transferred to the MN along the reverse path from AR1 to the proxy, wherein the proxy stops transfer of the data packet associated with the mobile receiver to AR1;

32) checking serial number of the data packet from AR1 by the proxy; and sending AR2 data packets that are not yet transferred to the mobile receiver; and 33) after MN accesses AR2, sending notification message from AR2 to the proxy in a reverse direction; and reporting to the proxy about a successful switch.

Furthermore, the reverse path can be determined by: adding a field to store information about the reverse path in a data packet destined to the mobile receiver; collecting link identification for the reverse path at each forwarding node passed by the data packet; and when the data packet reaches its destination, saving the link identification of all routers along the reverse path to form complete reverse path information.

Furthermore, the proxy can include a logic state table, which includes: identification ID of the mobile receiver, path information Path-0 from the publisher to AR1, path information Path-N from the publisher to AR2, and a timer TTL.

Furthermore, the proxy determines whether the switch is successful by: detecting, by AR2, access from the mobile receiver, forwarding buffered data packets to the mobile receiver, sending a handover success message to the proxy along the reverse path; if the proxy receives the handover success message before TTL expires, determining by the proxy that the mobile receiver has completed the handover process, thereby stopping serving proxy for the mobile receiver, continuing to send data packets to AR2 via the Path-N; and if the TTL has expired before the proxy receives the handover success message, determining by the proxy that handover is unsuccessful, deleting the mobile receiver from the logic state table.

Furthermore, the step of forwarding data packets to paths of the mobile receiver before and after handover can include making copies of the data packet by the proxy; sending a first copy of the data packet according to the path from the publisher to AR1; caching a second copy of the data packet according to the path from the publisher to the AR2.

The presently disclosed methods include the following benefits comparing to conventional technologies:

1) By constructing a new PURSUIT signaling messages, the invention method dynamically selects proxy in the handover process, which supports proxy selection in a distributed manner, rather than relying on any central node (such as Rendezvous), thus ensuring scalability for mobile routing.

2) A PURSUIT mobility management processes based on dynamic proxy ensures the recipient to have minimal downtime and packet loss during movement.

DETAILED DESCRIPTION OF THE INVENTION

In order to better illustrate the invention of the present patent, this section will be introduced according to the three stages of a handover: handover trigger, handover preparation, and handover execution.

1) The Handover Trigger

When MN detects a new Access Router (AR), namely AR2, MN sends information about AR2 to the current AR1 (following the triggering mechanism in IPv6 fast handover), thus triggering the current AR1 to prepare for handover operations.

2) The Handover Preparation

Figure 1:
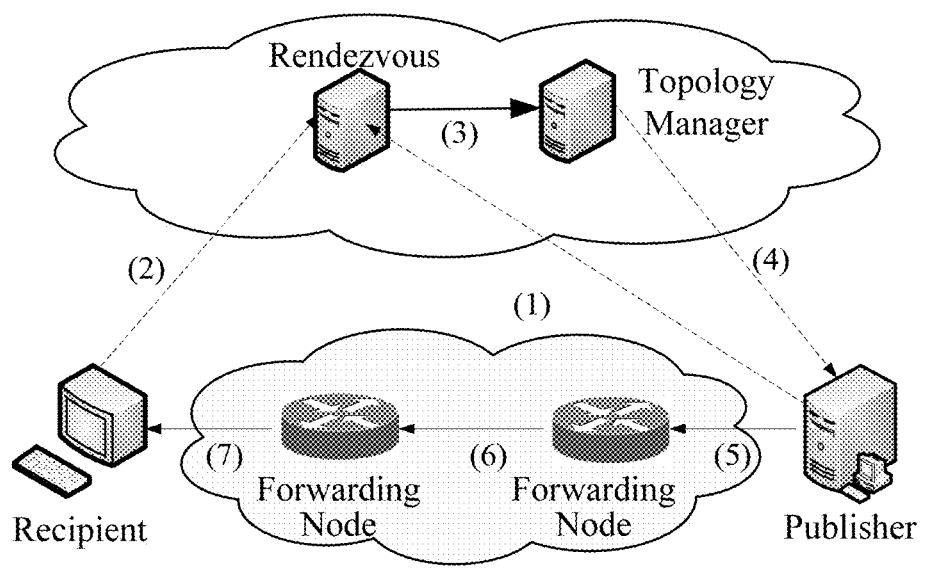
FIG. 1 is a basic network architecture diagram for PURSUIT.
Figure 2:
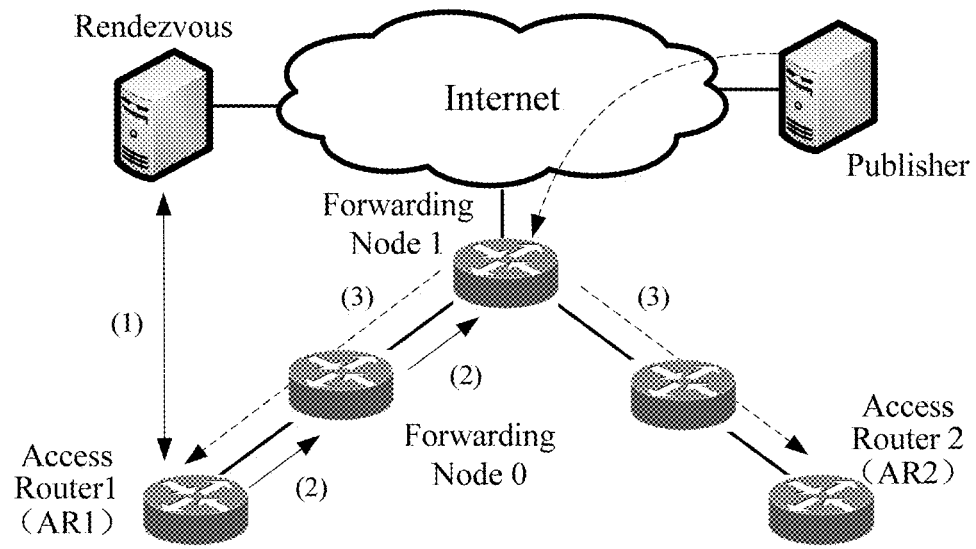
FIG. 2 is a schematic flow chart for handover preparation in accordance with the present invention.

After the current AR1 received the handover trigger message, it first selects a proxy for MN, and then transmits data packets via the proxy to the both paths before and after MN handover, to avoid data packet loss in the handover process. Such process is shown in FIG. 2.

(1) When the current access router AR1 first send a request to the convergence system (Rendezvous System, or RS, which includes Rendezvous and Topology manager) for the path from the publisher to the new access router AR2, RS returns the corresponding Bloom string (referred to in PURSUIT as zFilter) to AR1. AR1 is the access router for the mobile receiver, that is, the current position. AR2 is the target access router for the mobile receiver, that is, the new location after the handover.

(2) Subsequently, AR1 sends a probe message along the reverse path from AR1 to the publisher to find the proxy for this handover. The probe message contains information about the path from the publisher to the target AR2. When a forwarding node (FN) on the reverse path receives the probe message, it checks if its path identifier is included in the zFilter in the probe message to determine that the FN is a branch node for AR1 and AR2. If not, FN continues to forward the probe message upstream. If it is, FN determines that it is a branch node for this handover, thereby discarding the probe message.

(3) Subsequently, the proxy makes a copy of the data packet and sends it to MN, and forwarding the copy to MN's handover target position according to the new zFilter, wherein the MN's handover target position is the newly detected access router AR2. AR2 receives the data packet and caches the data packet till MN successfully completes handover.

Proxy can maintain a state table as shown in Table 1.

TABLE 1

| Proxy logic state table | | | |
| --- | --- | --- | --- |
| ID | Path-O | Path-N | Lifetime |
| MN-ID | zFilter1 | zFilter2 | TTL |

In this logic table, ID is MN's identity. Path-0 contains the old zFilter. Path-N includes the new zFilter. The last part is a timer. When TTL expires, but the proxy has not received a notification message about successful handover from the new access router AR, the proxy predicts that the switch did not happen, deletes the state table, and discontinues transmitting data as a proxy.

3) The Handover Execution

Figure 3:
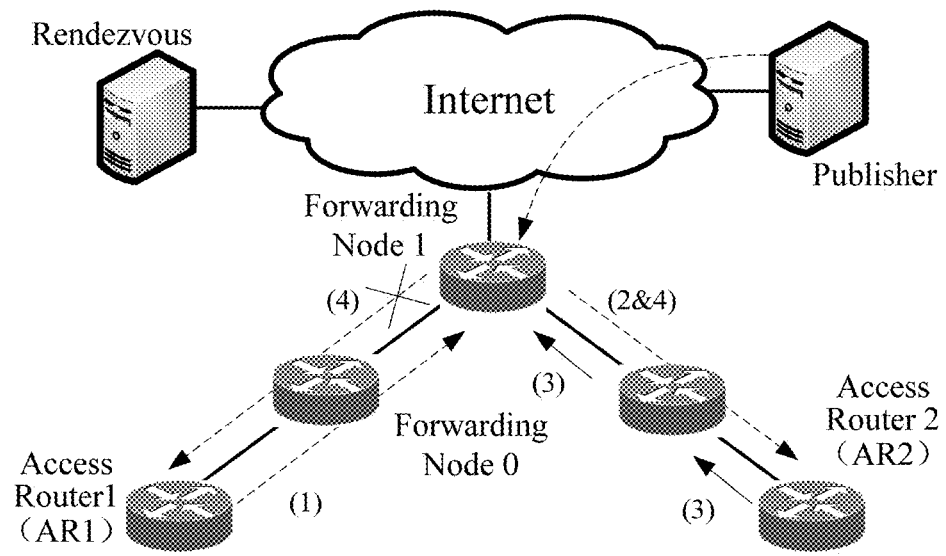
FIG. 3 is a flow chart for handover execution in accordance with the present invention.

After the link-layer handover, MN gains access to the new access router AR2, thereby triggering status updates from the old access router to the new access router, with the process shown in FIG. 3.

(1) After the MN formally switches, AR1 forwards data packets that have already been received but not yet transferred to MN, to proxy along the reverse path data. Thus the proxy recognizes that MN has moved to a new location, and will no longer send data packets to the old AR1.

(2) When proxy receives these data packets sent from AR1, the proxy checks their serial numbers, and forward those data packet that have not yet been sent to MN to the new location (AR2).

Figure 4:
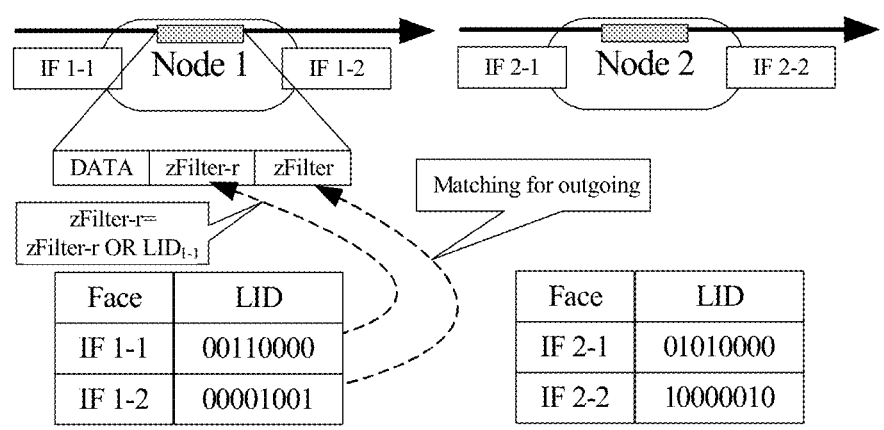
FIG. 4 is a basic schematic diagram for finding proxy through a reverse path in accordance with the present invention.

(3) When AR2 detects access of MN, it buffers data packets transmitted to MN on one hand, sends a notification to the proxy about the completion of handover on the other hand. The basic principle of finding proxy through the reverse path of the current path of data transmission is shown in FIG. 4. The details of the method are as follows:

In the normal packet transmission process, a field can be added in the data packet to store the reverse path information: identifications of the links of the access routers that collect the data packet when the data packet passes the forwarding nodes. Finally, when the data packet reaches its destination, all the entrance link identifications of the access routers along the path is saved, which forms complete information for the reverse forwarding path.

The forwarding node 1 forwards a data packet to the forwarding node 2, the forwarding path is zFilter, which matches IF 1-2 and IF 2-2. During data transmission, identifications of data entries are stored in zFilter-r, the calculation method of the forwarding node 1 and the forwarding node 2 are:

zFilter-r=zFilter-r OR $LID_{1-1}$
zFilter-r=zFilter-r OR $LID_{2-1}$ (4) When the proxy receives the notification message before TTL expires, the proxy determines that MN has completed the handover process, thereby stop serving as a proxy. Data packets will be sent in usual FN mode process to AR2.

(Because probe and notification messages are forwarded in the reverse path, it requires PURSUIT to support recording data packet transmission in reverse path. This can be implemented by existing technologies and is not described in detail in the present application.)

As described above, the present invention extends the signaling message in PURSUIT to support mobility management. Because the flexibility in its protocol, the present invention is not limited to the format of the signaling message, but the signaling message is required to contain the following specifications:

1) Path Request Information

In order to obtain information about the path from the publisher to a new location, thus finding a proxy, the current access router AR1 needs to send a route request message to the RS. The message should contain information about the publisher and the target AR (i.e. AR2).

2) Proxy Detection Information

To find proxy, the current AR (AR1) sends a message on the reverse path to the proxy. The message includes MN's identification information and new path information (path from the publisher to the target access router, that is, the data forwarding path after MN has moved to a new location).

3) State Synchronization Information

This message should include MN identification information, to allow proxy to determine which mobile node the handover procedure is for.

While the invention disclosed embodiments described above, but it is not intended to limit the present invention. Any skilled in the art, without departing from the spirit and scope of the present invention can be used for any alterations or equivalents. The scope of the present invention should be defined by the scope of the claims.

What is claimed is:

1. A method of data transmission for mobile receiver in a publish/subscribe system, comprising the steps of:
   1) handover trigger: detecting a new access router AR2 by a mobile receiver in the publish/subscribe system; and sending a handover trigger message comprising AR2 identification information from the mobile receiver to a router AR1 currently connected to the mobile receiver;
   2) handover preparation: receiving the handover trigger message by the AR1;
   selecting a branch node of the most recent position of the mobile receiver before handover as a proxy for the mobile receiver; and forwarding data packets to paths of the mobile receiver before and after handover,
   wherein the step of selecting a branch node of the most recent position of the mobile receiver before handover as a proxy for the mobile receiver comprises:
      21) requesting, by AR1 from the convergence system RS, a path from the publisher to AR2, the publisher to provide the data to be received by the mobile receiver; returning zFilter corresponding to the Bloom string from RS to AR1;
      22) sending a probe message on a reverse path from AR1 to the publisher, the probe message comprising the Bloom string zFilter; and
      23) receiving the probe message by a forwarding node FN on the reverse path; determining if the Bloom string zFilter includes a path identifier associated with the FN; and if so, determining if the forwarding node FN is the nearest branch node of AR1 and AR2, and if so, stopping forwarding the probe message; and if not, continuing to forward the probe message upstream from the forwarding node FN; and
   3) handover execution: handover access router of the mobile receiver to AR2 by the proxy; after the step of handover access router, triggering AR2 and AR1 to update data transfer for the mobile receiver; sending the data packets through the AR2 to the mobile receiver.

2. A method of data transmission for mobile receiver in a publish/subscribe system, comprising the steps of:
   1) handover trigger: detecting a new access router AR2 by a mobile receiver in the publish/subscribe system; and sending a handover trigger message comprising AR2 identification information from the mobile receiver to a router AR1 currently connected to the mobile receiver;
   2) handover preparation: receiving the handover trigger message by the AR1; selecting a branch node of the most recent position of the mobile receiver before handover as a proxy for the mobile receiver; and forwarding data packets to paths of the mobile receiver before and after handover; and
   3) handover execution: handover access router of the mobile receiver to AR2 by the proxy; after the step of handover access router, triggering AR2 and AR1 to update data transfer for the mobile receiver; sending the data packets through the AR2 to the mobile receiver, wherein the step of triggering AR2 and AR1 to update data transfer for the mobile receiver comprises:
      31) forwarding data packets received by AR1 but not yet transferred to the MN along the reverse path from AR1 to the proxy, wherein the proxy stops transfer of the data packet associated with the mobile receiver to AR1;
      32) checking serial number of the data packet from AR1 by the proxy; and sending AR2 data packets that are not yet transferred to the mobile receiver; and 33) after MN accesses AR2, sending notification message from AR2 to the proxy in a reverse direction; and reporting to the proxy about a successful switch.

3. The method according to claim 2, wherein the reverse path is determined by:
  adding a field to store information about the reverse path in a data packet destined to the mobile receiver;
  collecting link identification for the reverse path at each forwarding node passed by the data packet; and
  when the data packet reaches its destination, saving the link identification of all routers along the reverse path to form complete reverse path information.

4. The method according to claim 2, wherein the proxy includes a logic state table, which includes: identification ID of the mobile receiver, path information Path-0 from the publisher to AR1, path information Path-N from the publisher to AR2, and a timer TTL.

5. The method according to claim 4, wherein the proxy determines whether the switch is successful by:
  detecting, by AR2, access from the mobile receiver, forwarding buffered data packets to the mobile receiver, sending a handover success message to the proxy along the reverse path;
  if the proxy receives the handover success message before TTL expires, determining by the proxy that the mobile receiver has completed the handover process, thereby stopping serving proxy for the mobile receiver, continuing to send data packets to AR2 via the Path-N; and
  if the TTL has expired before the proxy receives the handover success message, determining by the proxy that handover is unsuccessful, deleting the mobile receiver from the logic state table.

6. A method of data transmission for mobile receiver in a publish/subscribe system, comprising the steps of:
  1) handover trigger: detecting a new access router AR2 by a mobile receiver in the publish/subscribe system; and sending a handover trigger message comprising AR2 identification information from the mobile receiver to a router AR1 currently connected to the mobile receiver;
  2) handover preparation: receiving the handover trigger message by the AR1; selecting a branch node of the most recent position of the mobile receiver before handover as a proxy for the mobile receiver; and forwarding data packets to paths of the mobile receiver before and after handover; and
  3) handover execution: handover access router of the mobile receiver to AR2 by the proxy; after the step of handover access router, triggering AR2 and AR1 to update data transfer for the mobile receiver; sending the data packets through the AR2 to the mobile receiver,
  wherein the step of forwarding data packets to paths of the mobile receiver before and after handover comprises:
  making copies of the data packet by the proxy;
  sending a first copy of the data packet according to the path from the publisher to AR1; and
  caching a second copy of the data packet according to the path from the publisher to the AR2.

* * * * *